United States Patent [19]

Unger et al.

[11] Patent Number: 4,457,212
[45] Date of Patent: Jul. 3, 1984

[54] HYDRAULIC RAM

[75] Inventors: Eberhart Unger, Lünen; Herbert Heitkamp, Werne; Heinz Hessel, Floesheim; Karl-Heinz Plester, Manfred Lagodka, both of Lünen, all of Fed. Rep. of Germany

[73] Assignee: Gewerkschaft Eisenhutte Westfalia, Lünen, Fed. Rep. of Germany

[21] Appl. No.: 365,467

[22] Filed: Apr. 5, 1982

[30] Foreign Application Priority Data

Apr. 10, 1981 [DE] Fed. Rep. of Germany ....... 3114525

[51] Int. Cl.$^3$ ............................................. F15B 15/26
[52] U.S. Cl. ............................................. 92/18; 92/23; 92/29; 92/52; 92/53; 91/169
[58] Field of Search ............... 92/29, 14, 18, 21 R, 92/23, 52, 53, 66, 107, 114, 51, 113, 24, 27, 28, 62; 91/169, 216 R, 519

[56] References Cited

U.S. PATENT DOCUMENTS

| | | | |
|---|---|---|---|
| 2,139,185 | 12/1938 | Engel | 92/27 |
| 2,275,722 | 3/1942 | Bowen | 92/62 |
| 2,604,076 | 7/1952 | Trevaskis | 92/62 |
| 2,933,070 | 4/1960 | Trumper et al. | 92/62 |
| 4,227,850 | 10/1980 | Farmer et al. | 92/52 |

FOREIGN PATENT DOCUMENTS 1243870 8/1971 United Kingdom .

Primary Examiner—Robert E. Garrett
Assistant Examiner—Scott L. Moritz
Attorney, Agent, or Firm—Thompson, Birch, Gauthier & Samuels

[57] ABSTRACT

A hydraulic ram for use in thrust-jacking of tunnel linings comprises a cylindrical outer member, a cylindrical inner member reciprocable within the outer member, and an extension member reciprocable within the inner member. A two-part clamping ring is provided for releasably locking the extension member to the inner member. An auxiliary drive is provided for retracting the extension member rapidly within the inner member. The auxiliary drive may be a mechanical spindle drive, or a hydraulic drive having an auxiliary piston reciprocable within an axial bore formed in the extension member. The clamping ring comprises spring means for urging the parts of the clamping ring in to the closed position, and piston-and-cylinder means for urging the parts of the clamping ring apart, against the biasing force of the spring means, to open the clamping ring.

18 Claims, 7 Drawing Figures

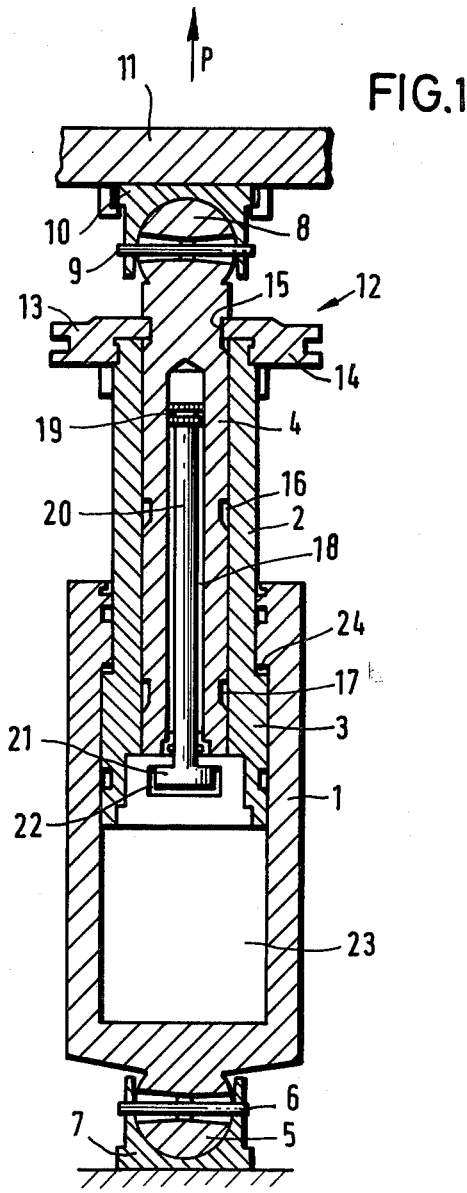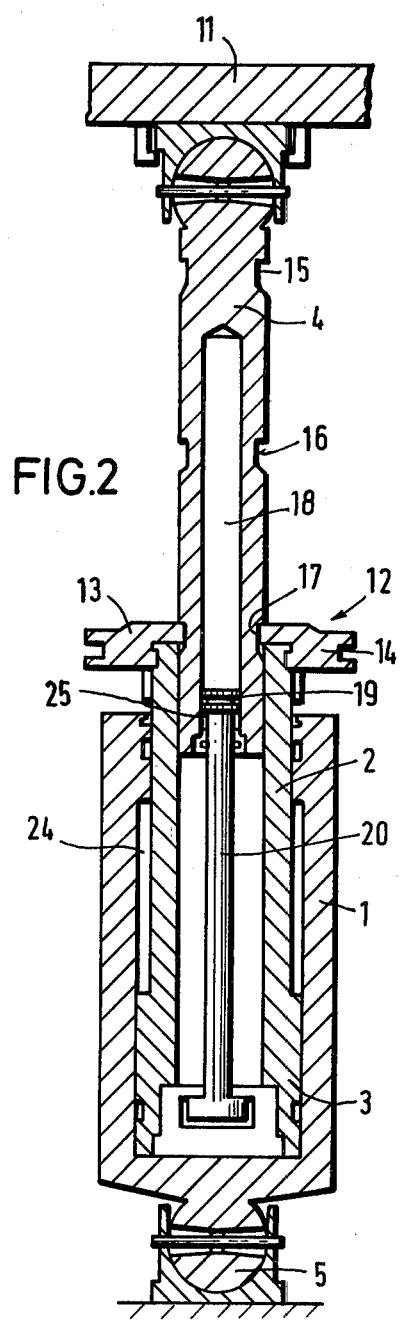

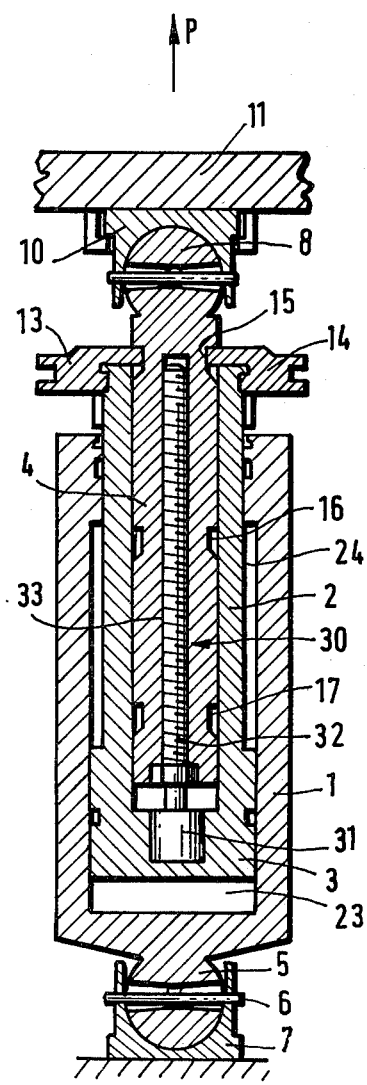
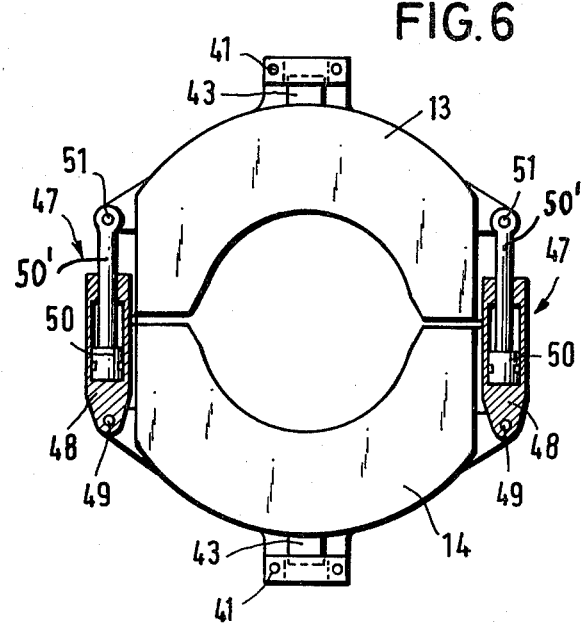
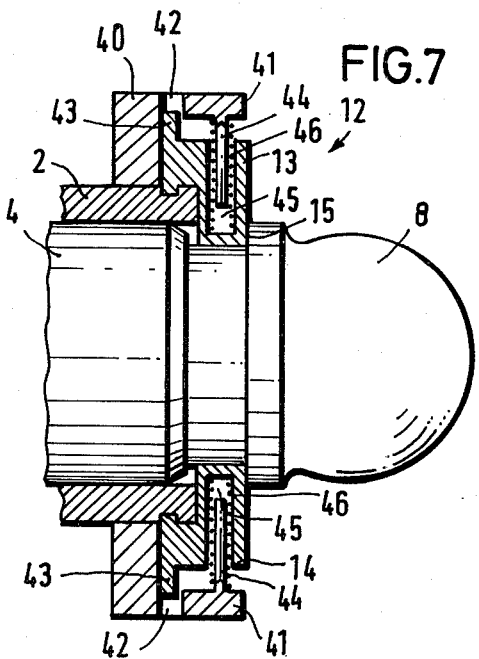
FIG. 5
FIG. 6
FIG. 7

HYDRAULIC RAM

BACKGROUND TO THE INVENTION

This invention relates to a hydraulic ram particularly for use in the thrust-jacking of tunnel linings, for advancing a mine roof support unit, or for use as a mine prop.

A known type of hydraulic ram has a cylindrical outer member, and a cylindrical inner member reciprocable within the outer member. An extension member is reciprocable within the inner member, and a clamping ring is provided for locking the extension member to the inner member.

British Patent Specification No. 1,243,870 describes a mine prop of this type. In this case, the extension member is locked to the inner member, by means of the clamping ring, during the working stroke of the ram (that is to say when the inner member is extended). The piston face of the inner member which is loaded during the working stroke is the larger (circular) piston face, so that a large force is always available for the working stroke. The extension member is extended with respect to the inner member, in stages, by repeated retractions of the inner member. Each time the inner member is retracted, the clamping ring is released; and each time the inner member is subsequently extended, the clamping ring is engaged so that the extension member is extended with the inner member. When the extension member needs to be retracted, the inner ram must be repeatedly retracted and extended, whilst the clamping ring is alternately released and closed. Since the large volume of the working chamber associated with the piston of the inner member has to be repeatedly pressurised for this purpose, this procedure is relatively time-consuming. Moreover, the opening and closing of the clamping ring has to be done manually. This is also relatively time-consuming. Furthermore, owing to the weights of the clamping ring parts, considerable force needs to be applied to do this.

An object of the invention is to provide a hydraulic ram of this type whose extension member can be retracted rapidly and without the need to retract the inner member several times.

Another object of the invention is to provide an improved form of clamping ring for such a hydraulic ram, which ring can more rapidly and easily be opened and closed.

SUMMARY OF THE INVENTION

The present invention provides a hydraulic ram comprising a cylindrical outer member, a cylindrical inner member disposed within the outer member and reciprocable relative thereto, an extension member disposed within the inner member and reciprocable relative thereto, a clamping device for releasably locking the extension member to the inner member, and drive means for retracting the extension member rapidly within the inner member.

The drive means enables the extension member to be retracted rapidly without the inner member having to be retracted and extended repeatedly. The drive means may also be used for extending the extension member, but it would not be used during a working stroke of the ram. Thus, where the ram is used for thrust-jacking of a tunnel lining, the drive means would not be used during the actual thrust-jacking process. The working stroke of the extension member is preferably longer than the working stroke of the inner member.

Advantageously, the drive means is provided, at least partly, within the extension member. Preferably, the clamping device is a two-part clamping ring, the clamping ring being provided at the free end of the inner member and being engageable with grooves formed in the outer surface of the extension member.

In one preferred embodiment, the drive means is a spindle drive which comprises a spindle motor and a screw-threaded spindle, the spindle being disposed in a screw-threaded bore formed in the extension member, and the spindle being in drivable engagement with the spindle motor. Advantageously, that portion of the inner member which is reciprocable within the outer member is formed as a piston, and wherein the spindle motor is positioned within an aperture in said piston. The circular (that is to say the larger) face of said piston is pressure loaded during the working stroke of the inner member. In other words, a large force is needed to move the inner member, whereas only a relatively small force is required to move the extension member.

In another preferred embodiment, the drive means is a hydraulic drive comprising an auxiliary piston reciprocable within an axial bore formed in the extension member, the auxiliary piston being connected to the inner member by means of a piston rod, and wherein means are provided for supplying pressurised hydraulic fluid to an annular working chamber defined by that portion of the axial bore on the piston rod side of the auxiliary piston, said working chamber being sealed with respect to a main working chamber provided within the outer member. Advantageously, that portion of the inner member which is reciprocable within the outer member is formed as a piston, the main working chamber being positioned on one side of said piston. Preferably, the piston rod of the auxiliary piston is connected to said piston by a rotary bearing. Means may be provided for discharging air from the axial bore as the extension member is retracted within the inner member. Because, the hydraulic drive is only used to move the extension member, the auxiliary piston and the bore which accommodates it can be of relatively small dimensions.

Preferably, the free end of the extension member and the end portion of the outer member remote from said free end of the extension member are each provided with a pin, the pins being attachable to abutment members to prevent relative rotation between the extension member and the outer member.

The invention also provides a hydraulic ram comprising a cylindrical outer member, a cylindrical inner member disposed within the outer member and reciprocable relative thereto, an extension member disposed within the inner member and reciprocable relative thereto, a multipart clamping ring for releasably locking the extension member to the inner member, and drive means for retracting the extension member rapidly within the inner member, the improvement comprising spring means for biasing the parts of the clamping ring towards a closed position, and hydraulic piston-and-cylinder means for opening the parts of the clamping ring against the force of the spring means.

Thus, when the piston-and-cylinder means is relieved of hydraulic pressure, the clamping ring is automatically closed by the spring means, thereby locking the extension member to the inner member. All that is required to open the clamping ring is to admit pressurised hydraulic fluid to the piston-and-cylinder means, thereby expanding the parts of the clamping ring against the biasing force of the spring means.

Advantageously, the clamping ring is of two-part construction, the spring means comprises a pair of springs disposed along the circumference of the clamping ring, and the piston-and-cylinder means comprises a pair of parallel piston-and-cylinder devices, each of which acts between adjacent end portions of the two parts of the clamping ring. Preferably, the clamping ring further comprises a retaining ring provided at the free end of the inner member, the two parts of the clamping ring being mounted on the retaining ring and being radially displaceable relative thereto, and wherein the retaining ring is provided with a pair of inwardly-extending radial pins, each of which engage within a respective aperture formed in one of the parts of the clamping ring, the springs being positioned in said apertures in the clamping ring and being backed by the retaining ring.

The retaining ring may be formed with axially-extending flanges from which the inwardly-extending radial pins project. Advantageously, the retaining ring is formed with openings, and the two parts of the clamping ring are provided with outwardly-extending radial projections which engage in said openings.

BRIEF DESCRIPTION OF THE DRAWINGS

Two forms of hydraulic ram, each of which is constructed in accordance with the invention, will now be described, by way of example, with reference to the accompanying drawings, in which:

FIGS. 1 to 4 are cross-sectional views of the first form of hydraulic ram, and each shows the ram in a different operational position;

FIG. 5 is a cross-sectional view of the second form of hydraulic ram;

FIG. 6 is a part-sectional end elevation of the clamping ring which forms part of the second form of ram; and FIG. 7 is a part-sectional side elevation of part of the second form of ram, and shows details of the clamping ring.

DESCRIPTION OF PREFERRED EMBODIMENTS

Figure 3:
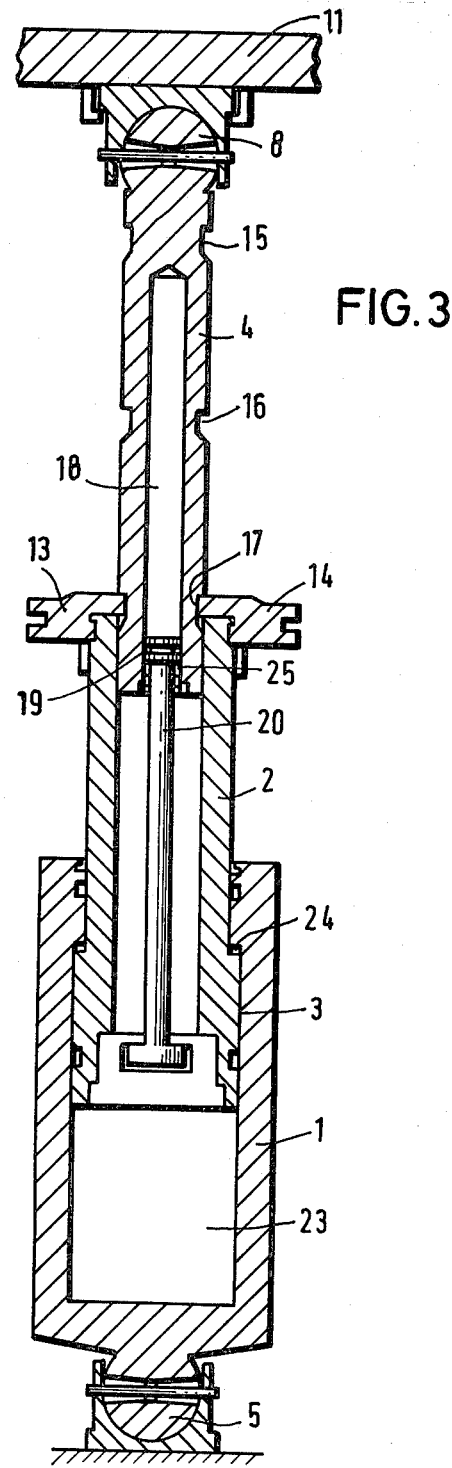

Referring to the drawings, FIGS. 1 to 4 show a hydraulic ram for use in tunnelling operations, the hydraulic ram having a hollow cylindrical outer member 1 and a hollow cylindrical inner member 2. The inner member 2 is formed with a piston 3 at one end thereof, the piston being reciprocable within the outer member 1. The inner member 2 is provided with an extension member 4 which is reciprocable within the inner member. A ball 5 is provided at the base of the outer member 1, the ball being mounted in a spherical socket 7 which is connected to an abutment member (not shown). The ball 5 is connected to the socket 7 by means of a pin 6. The ball 5 and the socket 7 thus form a universal joint which is capable of resisting tensile forces. Similarly, the free end of the extension member 4 is provided with a ball 8 which is mounted within a spherical socket 10. Here again, a pin 9 is provided for holding the ball 8 within the socket 10 in such a manner as to resist tensile forces. The pins 6 and 9 also prevent relative rotation between the extension member 4 and the outer member 1. Consequently, coiling or tearing of hydraulic supply lines to the ram are prevented. The socket 10 is fixed to a pressure ring 11, which is used to thrust forward a tunnel lining (not shown). In practice, a number of hydraulic rams (each of the type shown in FIGS. 1 to 4) are attached to, and distributed around, the pressure ring 11.

A clamping ring 12 is provided at the free (outer) end of the inner member 2. The clamping ring 12, which is constituted by two half rings 13 and 14, is used to lock the extension member 4 to the inner member 2. For this purpose, the extension member 4 is formed with three grooves 15, 16 and 17, into each of which the clamping ring 12 can engage. Thus, the extension member 4 can be locked to the inner member 2 in any one of the three positions defined by the grooves 15, 16 and 17.

An axial blind bore 18 is formed in the extension member 4, and a small auxiliary piston 19 is reciprocable within this bore. The piston 19 is movable within the bore 18 in a fluid-tight manner, and is connected to a piston rod 20. The free end of the piston rod 20 is provided with an enlarged head 21. The head 21 is mounted, with a predetermined amount of play, within a rotary bearing 22 associated with the piston 3. The bore 18, the piston 19, and the piston rod 20 form part of an auxiliary drive for driving the extension member 4 into the inner member 2.

The outer member 1 defines a cylindrical working chamber 23 positioned on that side of the piston 3 adjacent to the ball 5. An annular working chamber 24 is defined between the outer member 1 and the inner member 2 on the opposite side of the piston 3 to the cylindrical working chamber 23. An annular working chamber 25 is formed within the bore 18 and surrounding the piston rod 20. The working chambers 23, 24 and 25 can each be supplied with pressurised hydraulic fluid from a source (not shown). The working chamber 25 is isolated from the working chambers 23 and 24. Hence, provided the extension member 4 is not locked to the inner member 2, when pressurised hydraulic fluid is admitted to the working chamber 25, it acts upon the annular end face of the piston 19, and rapidly retracts the extension member within the inner member. The working chamber 25 thus forms part of the auxiliary drive.

The ram is also provided with a device (not shown) which discharges air from the bore 18 when the extension member 4 is retracted, and admits air when the extension member is extended.

The operation of the hydraulic ram will now be described. FIG. 1 shows the ram with its inner member 2 fully extended, and its extension member 4 fully retracted. In order to extend the inner member 2, pressurised hydraulic fluid is admitted to the working chamber 23. As the inner member 2 is extended, the pressure ring 11 (and hence the tunnel lining) is thrust forward in the direction of the arrow P. Prior to this movement, the extension member 4 is mechanically locked to the inner member 2 by forcing the two halves 13 and 14 of the clamping ring 12 into engagement with the groove 15.

When the position shown in FIG. 1 is reached, the clamping ring 12 is released from engagement with the groove 15 by moving the two halves 13 and 14 apart. The working chamber 24 is then loaded with pressurised hydraulic fluid, which retracts the inner member 2. However, because of its connection with the pressure ring 11, the extension member 4 does not move. Thus, as the inner member 2 is retracted within the outer member 1, the extension member 4 is extended with respect to the inner member. The inner member 2 is retracted until the clamping ring 12 is in alignment with the groove 16. The inner member 2 is then mechanically locked to the extension member 4 by engagement of the clamping ring 12 with the groove 16. The inner member 2 is then re-extended by re-admitting pressurised fluid into the working chamber 23. The extension member 4 and the pressure ring 11 are extended with the inner member 2. The clamping ring 12 is then released, the inner member 2 is fully retracted, and the clamping ring 12 is brought into engagement with the groove 17. As before, during this retraction of the inner member 2, the extension member 4 is maintained in its extended position by the pressure ring 11. The ram is then in the position shown in FIG. 2.

At this stage, the extension member 4 is fully extended with respect to the inner member 2, and the inner member is fully retracted within the outer member 1. Pressurized hydraulic fluid is then re-admitted to the working chamber 23, which results in extension of the inner member 2. As the extension member 4 is mechanically locked to the inner member 2, this forces the pressure ring 11 in the direction of the arrow P. When the inner member 2 has been fully extended, the ram is in the position shown in FIG. 3. In this position, the ram is fully extended.

Figure 4:
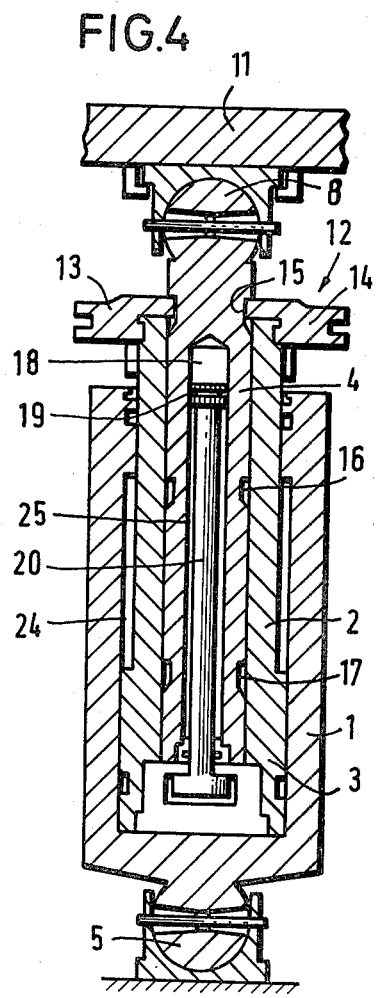

The extension member 4 is then fully retracted within the inner member 2 by means of the auxiliary drive In other words, pressurised hydraulic fluid is admitted to the working chamber 25. This loads the rod side of the piston 19 and rapidly retracts the extension member 4 into the inner member 2. Simultaneously, (or immediately threafter), pressurised hydraulic fluid is admitted to the working chamber 24. This causes the inner member 2 to retract within the outer member 1. When the extension member 4 is fully retracted within the inner member 2, and the inner member 2 is fully retracted within the outer member 1, the ram is in its fully retracted position. During these retraction movements, the pressure ring 11 is also retracted. The retraction of the pressure ring 11 permits a further section of tunnel lining to be inserted. The clamping ring 12 is then brought into engagement with the groove 15. This position is shown in FIG. 4. The whole cycle of operations can then be repeated to thrust-jack the tunnel lining forward. Each time the pressure ring 11 is retracted a new section of tunnel lining is introduced.

FIG. 5 shows a second form of hydraulic ram. This ram is similar to that shown in FIGS. 1 to 4, and so like reference numerals have been used for like parts. The only real difference between the two forms of ram is that the ram of FIG. 5 incorporates a mechanical auxiliary drive in place of the hydraulic auxiliary drive of FIGS. 1 to 4. The mechanical auxiliary drive is a spindle drive 30 having a small motor 31 which drives a screw-threaded spindle 32. The motor 31, which may be an electric motor or a hydraulic motor, is housed within the piston 3. The spindle 32 is arranged within an axial, screw-threaded bore 33 formed in the extension member 4. Thus, when the clamping ring 12 is released, rotation of the spindle 32 causes the extension member 4 to move into, or out of, the inner member 2.

The hydraulic ram shown in FIG. 5 operates in the following manner. Starting from the position shown in FIG. 5, in which the ram is fully retracted (that is to say the inner member 2 is fully retracted within the outer member 1, and the extension member 4 is fully retracted within the inner member 2), and the extension member is locked to the inner member by engagement of the clamping ring 12 with the groove 15. First, the inner member 2 is extended, by admitting pressurised hydraulic fluid to the working chamber 23, with the extension member 4 locked thereto. The clamping ring 12 is then released and the inner member 2 is retracted until the clamping ring is in alignment with the groove 16. The inner member 2 is then locked to the extension member 4 by engaging the clamping ring 12 with the groove 16. During this retraction of the inner member 2, the extension member 4 does not move owing to its connection to the pressure ring 11. The inner member 2 is retracted by means of the spindle drive 30, and possibly by simultaneously admitting pressurised hydraulic fluid to the working chamber 24. The inner member 2 is then re-extended by re-admitting pressurised hydraulic fluid to the working chamber 23. The extension member 4 and the pressure ring 11 are extended with the inner member 2. The clamping ring 12 is then released, the inner member 2 is fully retracted, and the clamping ring brought into engagement with the groove 17. As before, during this retraction of the inner member 2, the extension member 4 is maintained in its extended position by the pressure ring 11. In this position, the ram is fully extended.

In order to retract the ram, the clamping ring 12 is released, the extension member 4 is retracted using the spindle drive 30, and the inner member 2 is retracted by admitting pressurised hydraulic fluid into the working chamber 24.

FIGS. 6 and 7 show, in detail, the clamping ring 12 of the FIG. 5 embodiment. This clamping ring is also used in the embodiment of FIGS. 1 to 4. The two halves 13 and 14 of the clamping ring 12 are held within a retaining ring 40. The retaining ring 40 is fixed to the outer end of the inner member 2, and the two clamping ring halves 13 and 14 are radially displaceable within the retaining ring. The retaining ring 40 is provided with two radial flanges 41, each of which is formed with an aperture 42. The apertures 42 are diametrically opposite one another, and each engages with a respective guide member 43. The guide members 43 are attached to, or integral with, the halves 13 and 14 of the clamping ring 12. An inwardly-extending radial pin 44 is attached to (or integrally formed with) each of the flanges 41. Each of the pins 44 engages within a respective aperture 45 formed in the associated clamping ring half 13 or 14. A respective compression spring 46 is positioned within each of the apertures 45, the springs surrounding the respective pins 44. Each spring 46 abuts the associated flange 41 and the base of the associated aperture 45. Consequently, the springs 46 bias the two clamping ring halves 13 and 14 towards one another. In the position shown in FIG. 7, this results in the clamping ring 12 being forced into engagement with the groove 15.

A respective hydraulic ram 47 is associated with each pair of adjacent end portions of the two clamping ring halves 13 and 14 (see FIG. 6). The rams 47 are diametrically opposed and generally parallel. The cylinder 48 of each ram 47 is pivotally connected, by means of a pivot joint 49, to one half 13 of the clamping ring 12. The piston 50 of each ram 47 is pivotally connected, via a piston rod 50', to the other clamping ring half 14 by means of a pivot joint 51. Consequently, by admitting pressurised hydraulic fluid to the cylindrical working chambers of the rams 47 (that is to say the working chambers remote from the piston rods 50'), the two halves 13 and 14 of the clamping ring 12 can be forced apart against the biasing force of the springs 46, thereby releasing the clamping ring 12. Conversely, when the rams 47 are relieved of pressure, the springs 46 automatically bias the clamping ring halves 13 and 14 together.

We claim:

1. A hydraulic ram comprising a cylindrical outer member, a cylindrical inner member disposed within the outer member and reciprocable relative thereto, an extension member disposed within the inner member and reciprocable relative thereto, a clamping device for releasably locking the extension member to the inner member, and drive means provided at least partly within the extension member for retracting the extension member rapidly within the inner member.

2. A hydraulic ram according to claim 1, wherein the clamping device is a two-part clamping ring, the clamping ring being provided at the free end of the inner member and being engageable with grooves formed in the outer surface of the extension member.

3. A hydraulic ram according to claim 1, wherein the drive means is a spindle drive.

4. A hydraulic ram according to claim 3, wherein the spindle drive comprises a spindle motor and a screw-threaded spindle, the spindle being disposed in a screw-threaded bore formed in the extension member, and the spindle being in drivable engagement with the spindle motor.

5. A hydraulic ram according to claim 4, wherein that portion of the inner member which is reciprocable within the outer member is formed as a piston, and wherein the spindle motor is positioned within an aperture in said piston.

6. A hydraulic ram according to claim 1, wherein the drive means is a hydraulic drive comprising an auxiliary piston reciprocable within an axial bore formed in the extension member, the auxiliary piston being connected to the inner member by means of a piston rod, and wherein means are provided for supplying pressurised hydraulic fluid to an annular working chamber defined by that portion of the axial bore on the piston rod side of the auxiliary piston, said working chamber being sealed with respect to a main working chamber provided within the outer member.

7. A hydraulic ram according to claim 6, wherein that portion of the inner member which is reciprocable within the outer member is formed as a piston, the main working chamber being positioned on one side of said piston.

8. A hydraulic ram according to claim 7, wherein the piston of the auxiliary piston is attached to said piston.

9. A hydraulic ram according to claim 8, wherein the piston rod of the auxiliary piston is connected to said piston by a rotary bearing.

10. A hydraulic ram according to claim 6, further comprising means for discharging air from the axial bore as the extension member is retracted within the inner member.

11. A hydraulic ram according to claim 1, wherein the free end of the extension member and the end portion of the outer member remote from said free end of the extension member are each provided with a pin, the pins being attachable to abutment members to prevent relative rotation between the extension member and the outer member.

12. A hydraulic ram comprising a cylindrical outer member, a cylindrical inner member disposed within the outer member and reciprocable relative thereto, an extension member disposed within the inner member and reciprocable relative thereto, a clamping device for releasably locking the extension member to the inner member, and a spindle drive for retracting the extension member rapidly within the inner member, the spindle drive comprising a spindle motor and a screw-threaded spindle, the spindle being disposed in a screw-threaded bore formed in the extension member, and the spindle being in drivable engagement with the spindle motor.

13. A hydraulic ram comprising a cylindrical outer member, a cylindrical inner member disposed within the outer member and reciprocable relative thereto, an extension member disposed within the inner member and reciprocable relative thereto, a clamping device for releasably locking the extension member to the inner member, and a hydraulic drive for retracting the extension member rapidly within the inner member, the hydraulic drive comprising an auxiliary piston reciprocable within an axial bore formed in the extension member, the auxiliary piston being connected to the inner member by means of a piston rod, and wherein means are provided for supplying pressurised hydraulic fluid to an annular working chamber defined by that portion of the axial bore on the piston rod side of the auxiliary piston, said working chamber being sealed with respect to a main working chamber provided within the outer member.

14. In a hydraulic ram comprising a cylindrical outer member, a cylindrical inner member disposed within the outer member and reciprocable relative thereto, an extension member disposed within the inner member and reciprocable relative thereto, a multi-part clamping ring for releasably locking the extension member to the inner member, and drive means provided at least partly within the extension member for retracting the extension member rapidly within the inner member, the improvement comprising spring means for biasing the parts of the clamping ring towards a closed position, and hydraulic piston-and-cylinder means for opening the parts of the clamping ring against the force of the spring means.

15. In a hydraulic ram according to claim 14, wherein the clamping ring is of two-part construction, the spring means comprises a pair of springs disposed along the circumference of the clamping ring, and the piston-and-cylinder means comprises a pair of parallel piston-and-cylinder devices, each of which acts between adjacent end portions of the two parts of the clamping ring.

16. In a hydraulic ram according to claim 15, further comprising a retaining ring provided at the free end of the inner member, the two parts of the clamping ring being mounted on the retaining ring and being radially displaceable relative thereto, and wherein the retaining ring is provided with a pair of inwardly-extending radial pins, each of which engages within a respective aperture formed in one of the parts of the clamping ring, the springs being positioned in said apertures in the clamping ring and being backed by the retaining ring.

17. In a hydraulic ram according to claim 16, wherein the retaining ring is formed with axially-extending flanges from which the inwardly-extending radial pins project.

18. In a hydraulic ram according to claim 16, wherein the retaining ring is formed with openings, and the two parts of the clamping ring are provided with outwardly-extending radial projections which engage in said openings.

* * * * *